United States Patent
Hoshi

(10) Patent No.: US 7,782,544 B2
(45) Date of Patent: Aug. 24, 2010

(54) ZOOM LENS SYSTEM AND IMAGE PICKUP APPARATUS INCLUDING THE SAME

(75) Inventor: Koji Hoshi, Yokohama (JP)

(73) Assignee: Canon Kabushiki Kaisha (JP)

( * ) Notice: Subject to any disclaimer, the term of this patent is extended or adjusted under 35 U.S.C. 154(b) by 101 days.

(21) Appl. No.: 11/326,722

(22) Filed: Jan. 6, 2006

(65) Prior Publication Data

US 2006/0146417 A1 Jul. 6, 2006

(30) Foreign Application Priority Data

Jan. 6, 2005 (JP) .............................. 2005-001491

(51) Int. Cl.
G02B 15/14 (2006.01)
G02B 27/64 (2006.01)

(52) U.S. Cl. .................. 359/689; 359/554; 348/208.11

(58) Field of Classification Search ................ 359/676, 359/687, 689, 554; 396/52–55
See application file for complete search history.

(56) References Cited

U.S. PATENT DOCUMENTS

| | | | |
|---|---|---|---|
| 5,000,549 A | 3/1991 | Yamazaki | |
| 5,585,966 A | 12/1996 | Suzuki | |
| 5,652,678 A * | 7/1997 | Suzuki et al. | ............... 359/557 |
| 5,760,957 A * | 6/1998 | Suzuki | ....................... 359/557 |
| 6,414,800 B1 | 7/2002 | Hamano | |
| 6,512,633 B2 * | 1/2003 | Konno et al. | ................. 359/557 |
| 2004/0223233 A1 * | 11/2004 | Horiuchi | ..................... 359/687 |

FOREIGN PATENT DOCUMENTS

| | | |
|---|---|---|
| JP | 2-93620 | 4/1990 |
| JP | 6-337374 | 12/1994 |
| JP | 7-128619 | 5/1995 |
| JP | 7-199124 | 8/1995 |
| JP | 2001-66500 | 3/2001 |

OTHER PUBLICATIONS

Chinese Office Action dated May 25, 2007 for counterpart Chinese patent application No. 200610005715.1 (with English translation).
Chinese Office Action dated Nov. 16, 2007 for counterpart Chinese Patent Application 2006100057151.

* cited by examiner

*Primary Examiner*—Jordan M. Schwartz
(74) *Attorney, Agent, or Firm*—Rossi, Kimms & McDowell LLP

(57) ABSTRACT

Provided is a zoom lens system which includes a plurality of lens units separated from one another at intervals changed during at least one of zooming and focusing and an aperture stop. The plurality of lens units include a movable lens unit for displacing an image formed by the zoom lens system within a plane perpendicular to an optical axis. The movable lens unit includes a first lens subunit located on an object side of the aperture stop and a second lens subunit located on an image side of the aperture stop. When the image formed by the zoom lens system is displaced within the plane perpendicular to the optical axis, the aperture stop is held and the first lens subunit and the second lens subunit are moved to have a component in a direction orthogonal to the optical axis.

4 Claims, 7 Drawing Sheets

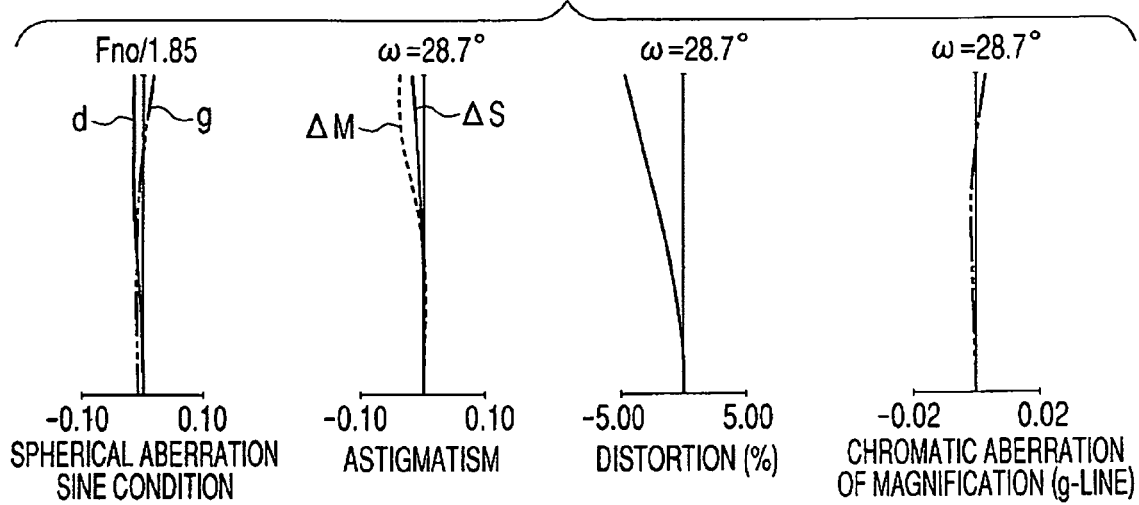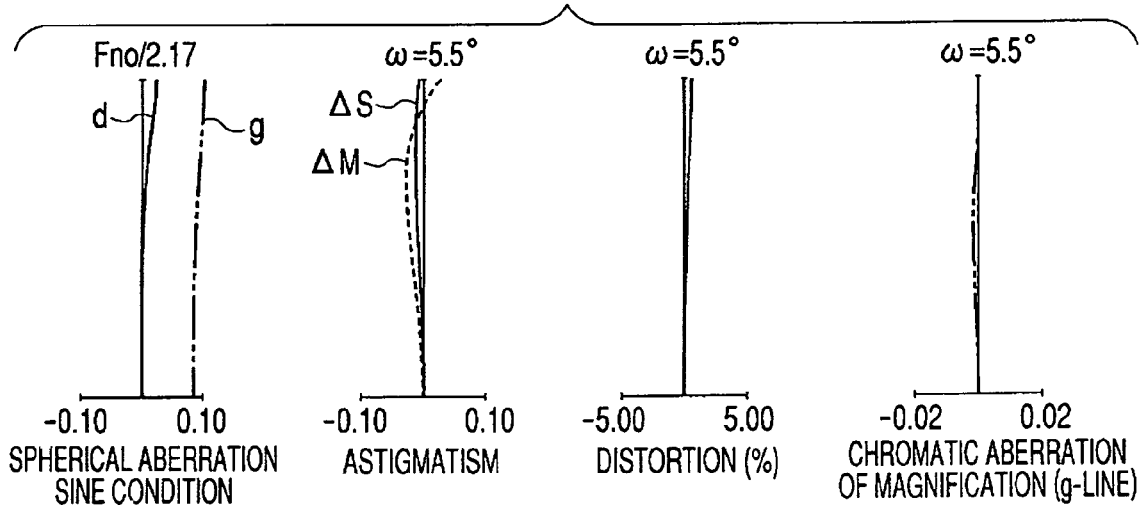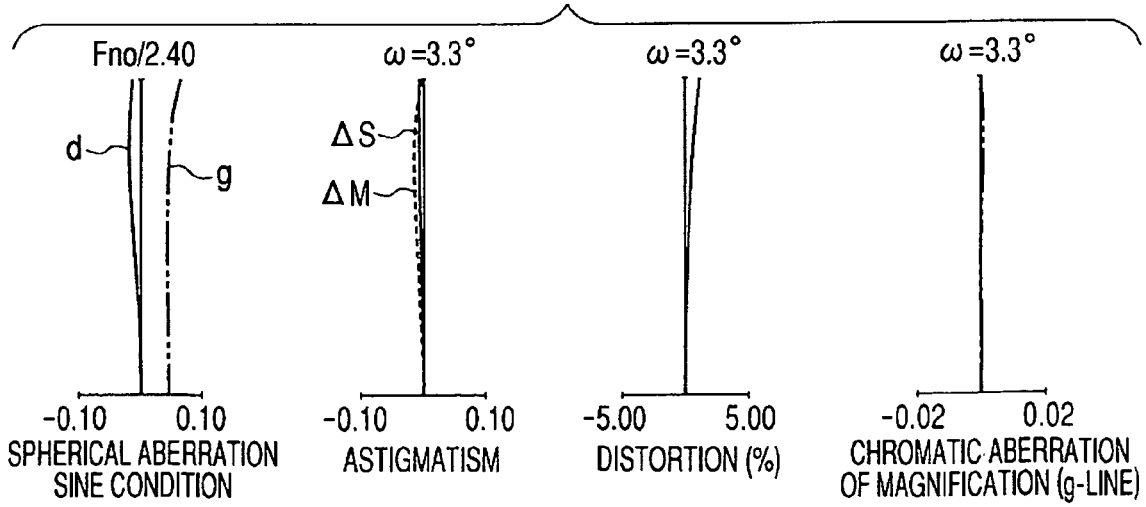

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the zoom lens system. The present invention is suitable for use in, for example, a photographic camera, a video camera, an electronic still camera, a digital camera, and a 3-CCD electronic camera.

2. Related Background Art

When vibrations are incidentally transmitted to a photographing system, a photography image blurs. Conventionally, various zoom lens systems including a mechanism for making compensation for image blur caused by the accidental vibrations (image stabilizing mechanism) have been proposed. For example, there has been known an optical system in which a part of lens units composing the optical system is moved in a direction substantially perpendicular to the optical axis to make compensation for image blur caused by vibrations (Japanese Patent Application Laid-Open No. H07-128619, Japanese Patent Application Laid-Open No. H07-199124 (corresponding to U.S. Pat. No. 5,585,966), Japanese Patent Application Laid-Open No. 2001-066500 (corresponding to U.S. Pat. No. 6,414,800), Japanese Patent Laid-Open No. H06-337374 (corresponding to U.S. Pat. No. 5,652,678), and Japanese Patent Laid-Open No. H02-093620 (corresponding to U.S. Pat. No. 5,000,549).

In general, an optical system in which a lens unit (correction lens unit) which is a part of the photographing system is decentered in parallel in a direction perpendicular to the optical axis to correct image blur has an advantage that the image blur can be relatively easily corrected.

However, the optical system requires a drive means (actuator) for displacing the correction lens unit. Therefore, there is a problem in that the amount of produced decentering aberration increases at the time of image stabilizing.

For example, when the number of lenses composing the correction lens unit is large and thus the weight of the correction lens unit becomes higher, electrical driving requires large torque.

When an imaging magnification of the correction lens unit, refractive power thereof, and the like are not suitably set, a movement amount of the correction lens unit which is required to obtain a correction effect for a predetermined amount of image blur becomes large, with the result that a size of the entire optical system increases.

Therefore, in order to prevent optical performance from deteriorating at the time of correcting the image blur and to obtain a preferable correction characteristic, it is necessary that an optical arrangement of the correction lens unit be suitably set for the optical system including the image stabilizing mechanism.

SUMMARY OF THE INVENTION

An object of the present invention is to provide a zoom lens system in which a preferable image can be held in the entire optical system at the time of vibration compensation.

An illustrated zoom lens system according to the present invention includes a plurality of lens units separated from one another by intervals changed during at least one of zooming and focusing and an aperture stop. The plurality of lens units include a movable lens unit for displacing an image formed by the zoom lens system within a plane perpendicular to an optical axis. The movable lens unit includes a first lens subunit located on an object side of the aperture stop and a second lens subunit located on an image side of the aperture stop. When the image formed by the zoom lens system is to be displaced within the plane perpendicular to the optical axis, the aperture stop is held and the first lens subunit and the second lens subunit are moved so as to have a component in a direction orthogonal to the optical axis.

BRIEF DESCRIPTION OF THE DRAWINGS

FIGS. 2A, 2B, and 2C are graphs showing various aberrations of the zoom lens according to Embodiment 1 of the present invention;

DESCRIPTION OF THE PREFERRED EMBODIMENTS

Hereinafter, a zoom lens system according to each of embodiments of the present invention and an image pickup apparatus including the zoom lens system will be described.

Figure 1A:
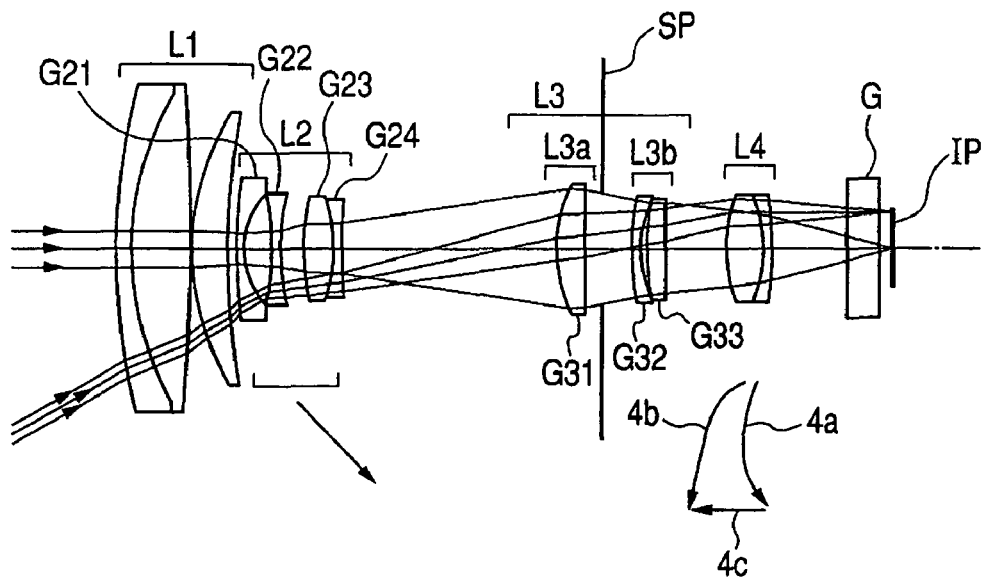
FIGS. 1A, 1B, and 1C are lens sectional views showing a zoom lens according to Embodiment 1 of the present invention.
Figure 1B:
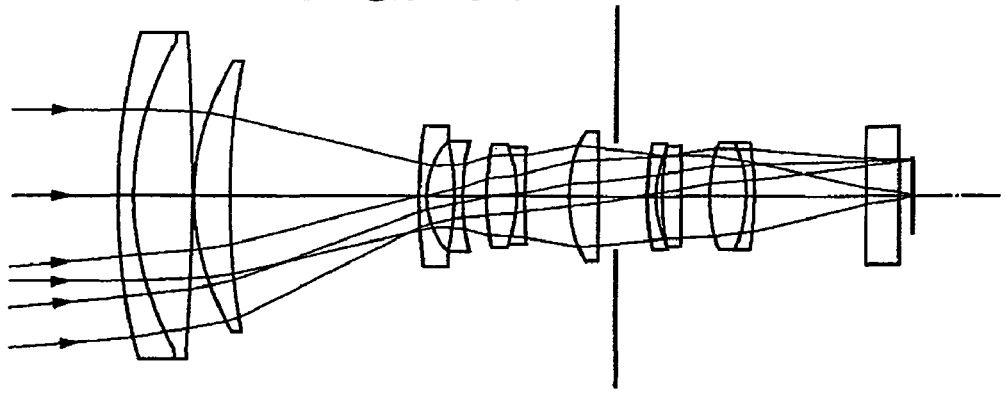
Figure 1C:
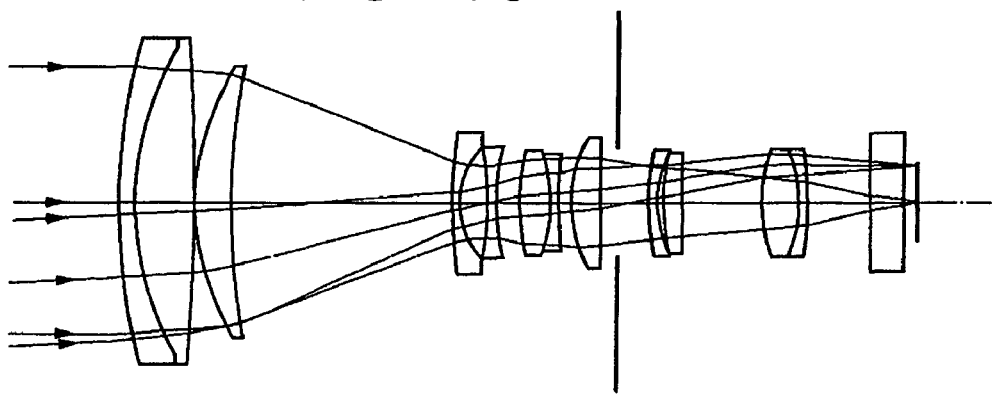

FIGS. 1A, 1B, and 1C are lens sectional views showing a zoom lens at a wide-angle end (short focal length end), an intermediate zoom position, and a telephoto end (long focal length end) according to Embodiment 1 of the present invention. FIGS. 2A, 2B, and 2C are graphs showing aberrations of the zoom lens at the wide-angle end, the intermediate zoom position, and the telephoto end according to Embodiment 1 of the present invention.

Figure 3A:
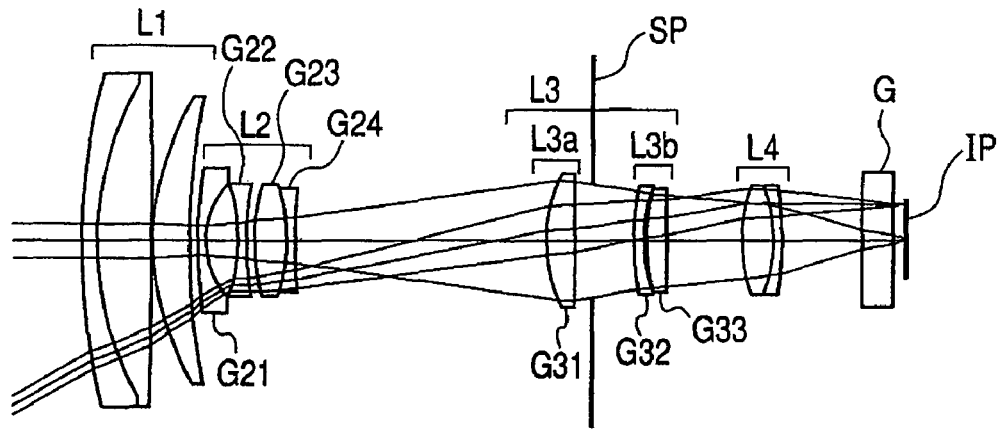
FIGS. 3A, 3B, and 3C are lens sectional views showing a zoom lens according to Embodiment 2 of the present invention.
Figure 3B:
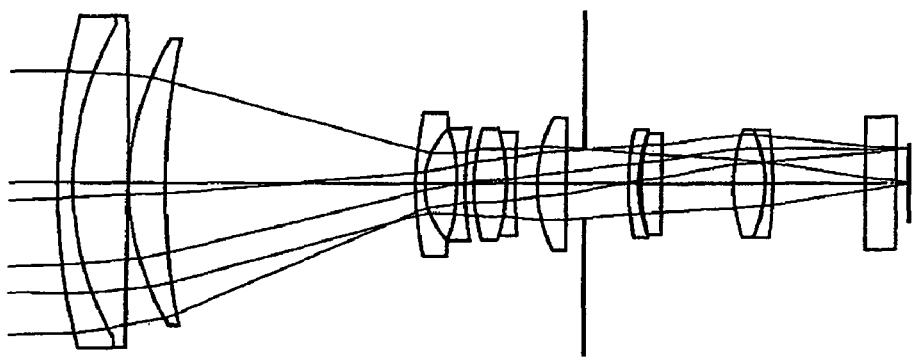
Figure 3C:
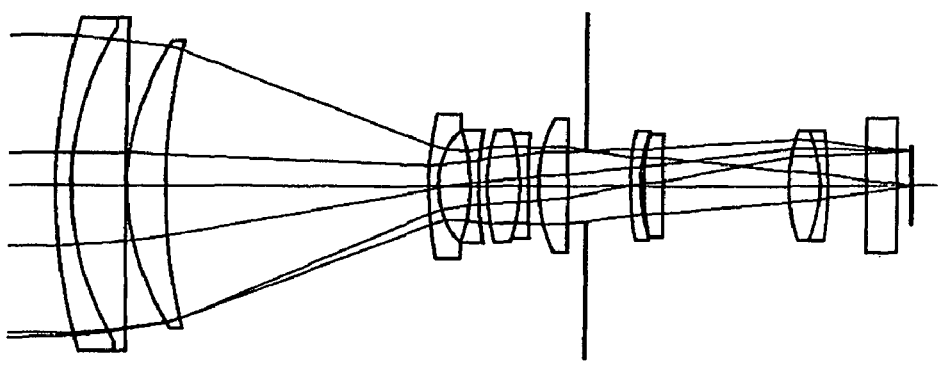
Figure 4A:
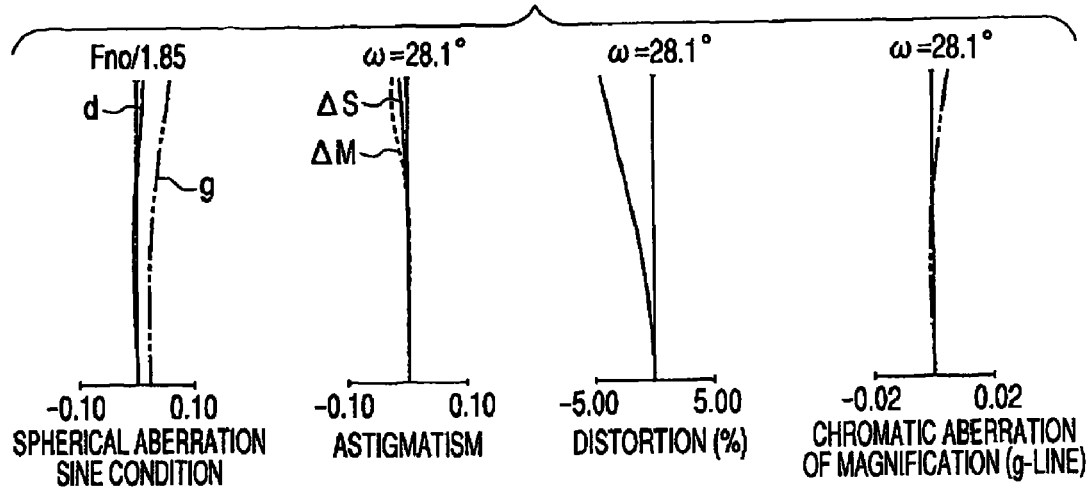
FIGS. 4A, 4b, and 4C are graphs showing various aberrations of the zoom lens according to Embodiment 2 of the present invention.
Figure 4B:
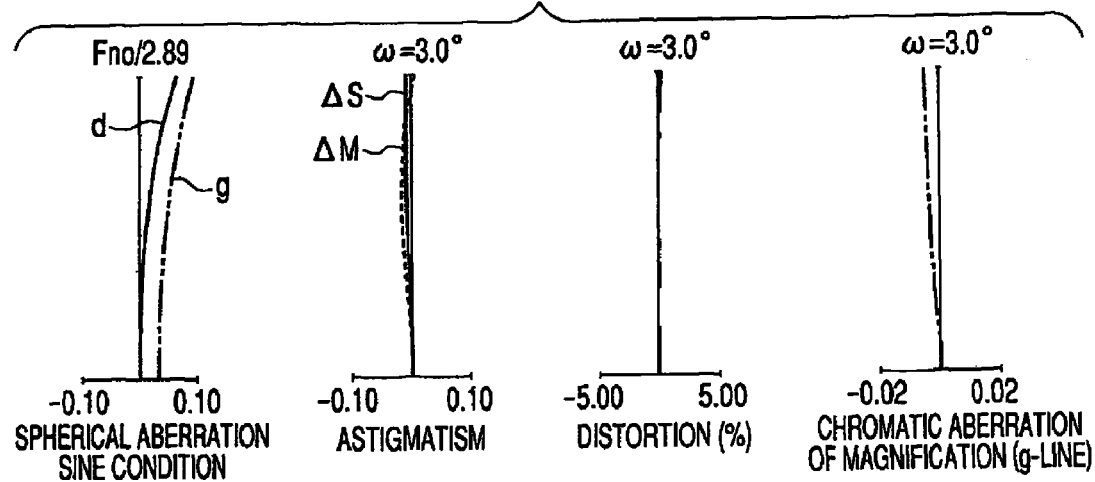
Figure 4C:
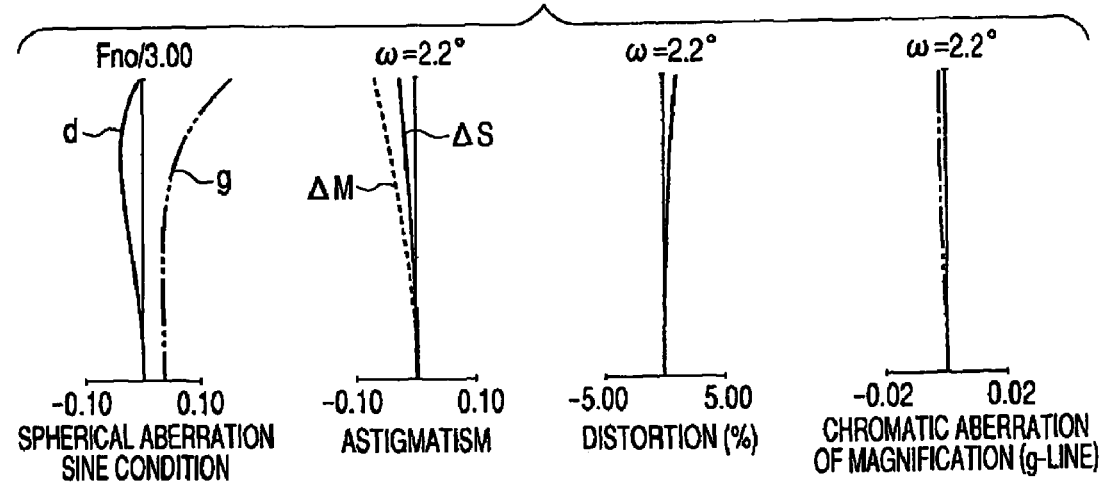

FIGS. 3A, 3B, and 3C are lens sectional views showing a zoom lens at a wide-angle end, an intermediate zoom position, and a telephoto end according to Embodiment 2. FIGS. 4A, 4B, and 4C are graphs showing aberrations of the zoom lens at the wide-angle end, the intermediate zoom position, and the telephoto end according to Embodiment 2.

Figure 5A:
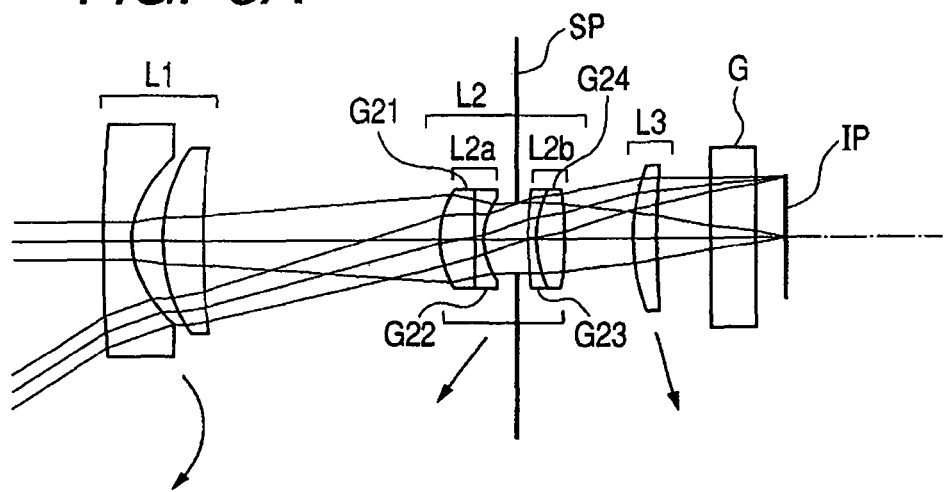
FIGS. 5A, 5B, and 5C are lens sectional views showing a zoom lens according to Embodiment 3 of the present invention.
Figure 5B:
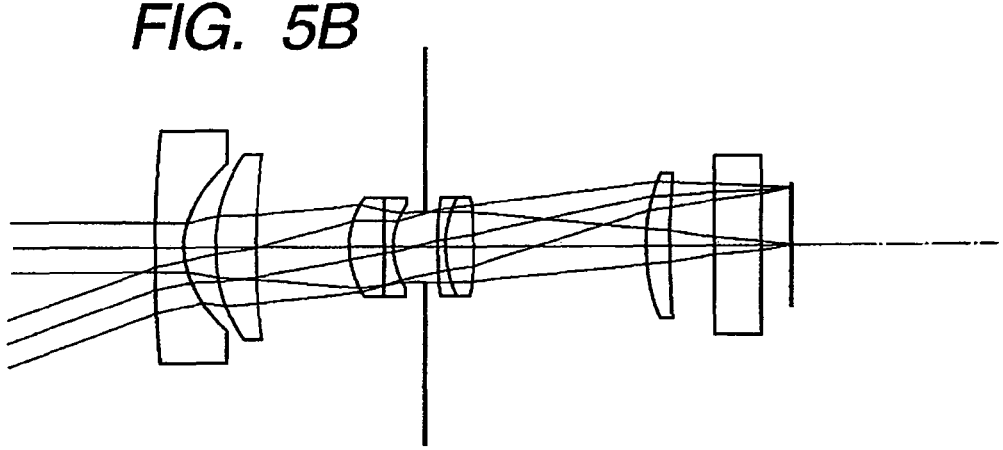
Figure 5C:
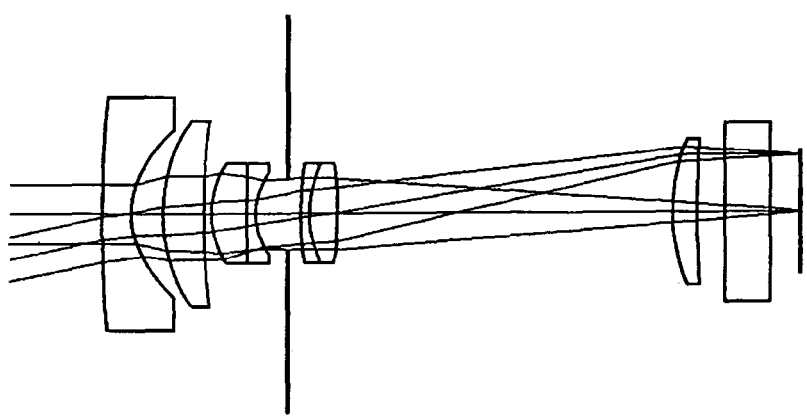

FIGS. 5A, 5B, and 5C are lens sectional views showing a zoom lens at a wide-angle end, an intermediate zoom position, and a telephoto end according to Embodiment 3 of the present invention.

Figure 6A:
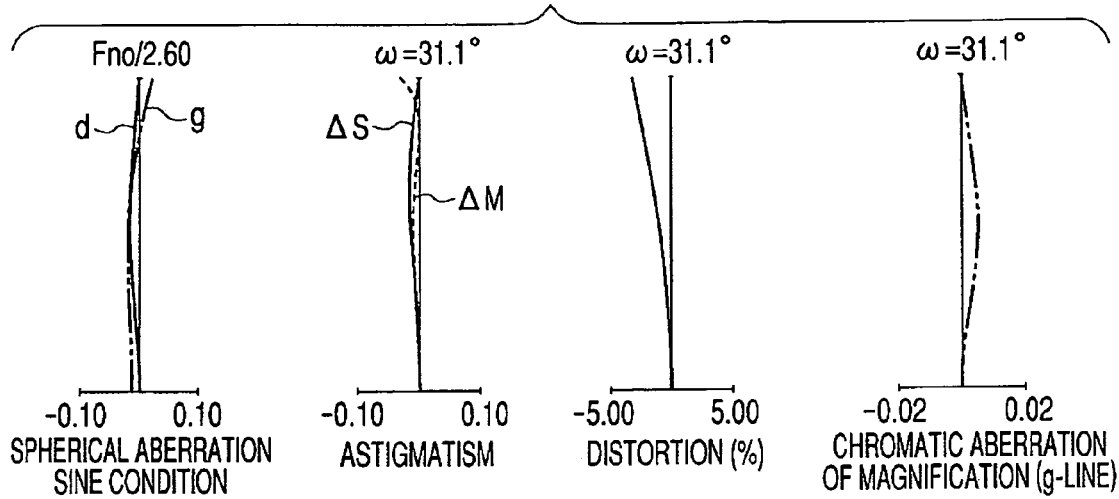
FIGS. 6A, 6B, and 6C are graphs showing various aberrations of the zoom lens according to Embodiment 3 of the present invention.
Figure 6B:
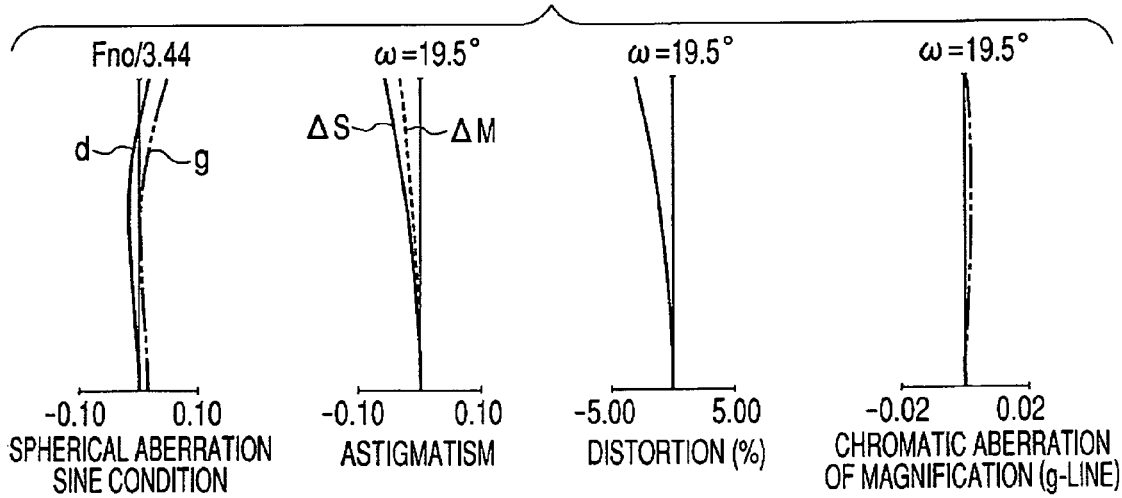
Figure 6C:
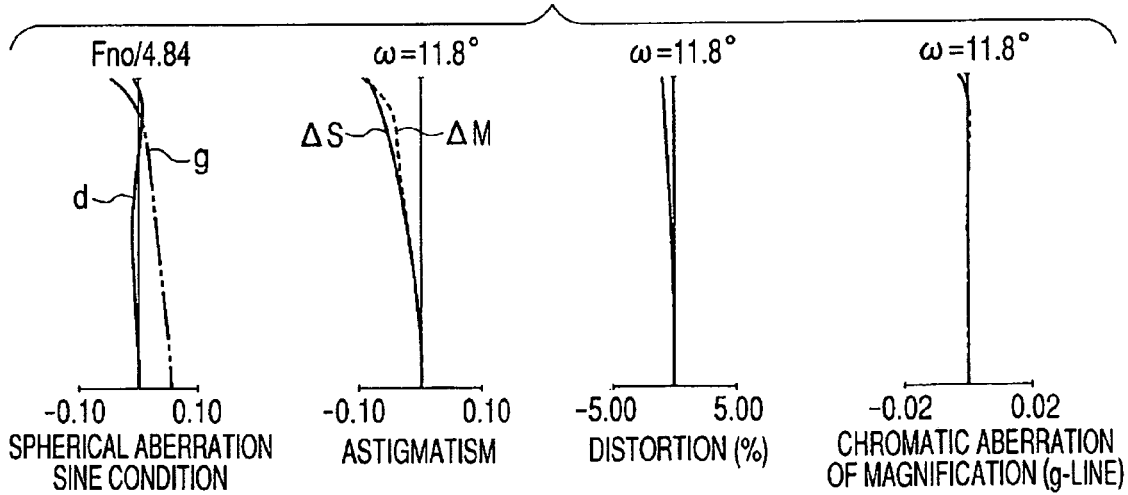

FIGS. 6A, 6B, and 6C are graphs showing aberrations of the zoom lens at the wide-angle end, the intermediate zoom position, and the telephoto end according to Embodiment 3 of the present invention.

Figure 7:
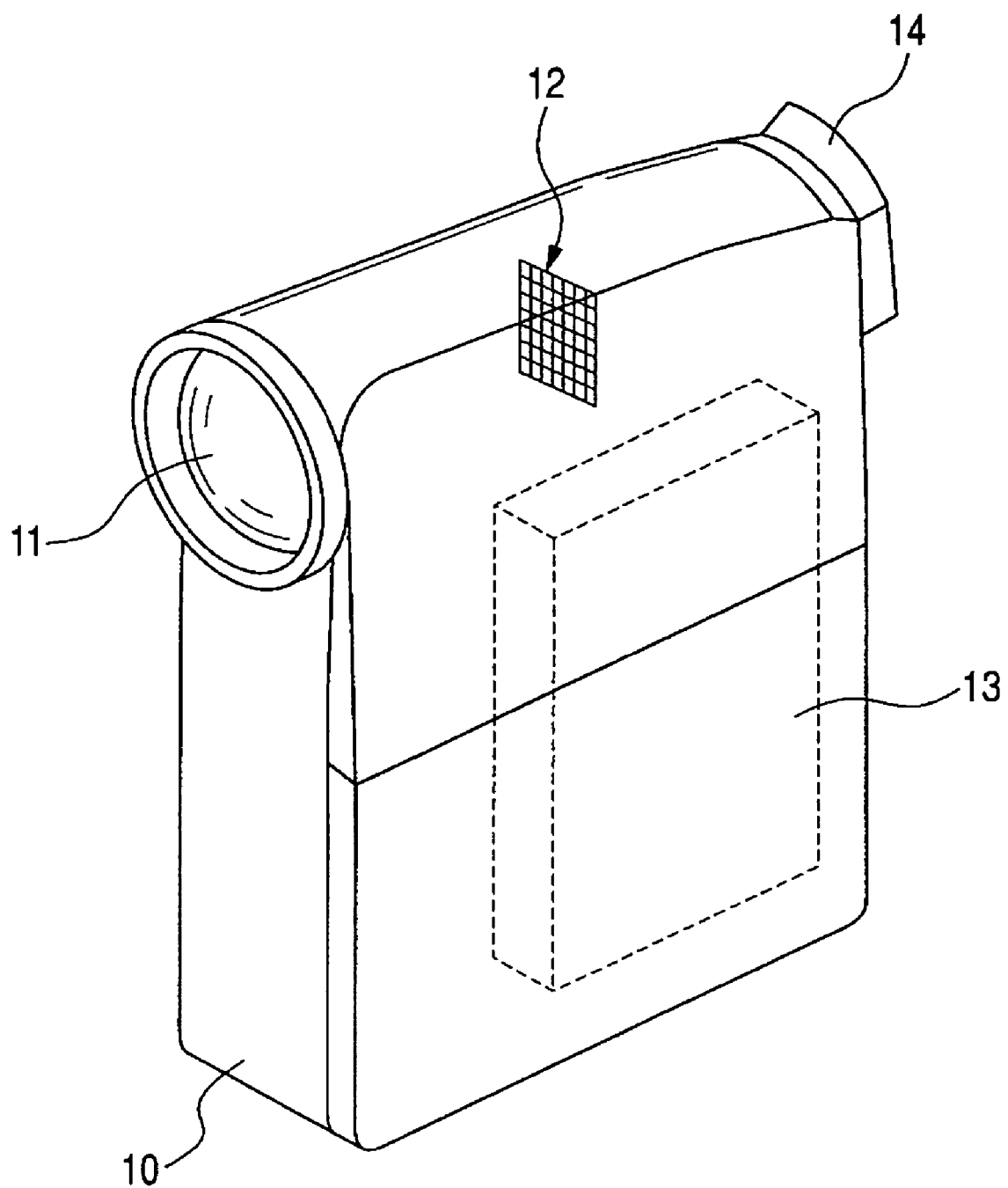
FIG. 7 is a main part schematic view showing an image pickup apparatus.

FIG. 7 is a main part schematic view showing a video camera (image pickup apparatus) including the zoom lens system according to the present invention.

In each of FIGS. 1A, 1B, 1C, 3A, 3B, 3C, 5A, 5B, and 5C, the left is an object side (front) and the right is an image side (rear). The zoom lens according to each of the embodiments is a photographing lens system used for the image pickup apparatus.

Reference symbol "i" denotes an order counted from the object side and Li denotes an i-th lens unit.

In FIGS. 1A, 1B, 1C, 3A, 3B, and 3C, a third lens unit L3 includes lens subunits L3a and L3b. In FIGS. 5A, 5B, and 5C, a second lens unit L2 includes lens subunits L2a and L2b.

Reference symbol "SP" denotes an aperture stop. In each of Embodiments 1 and 2 of the present invention of the present invention, an aperture stop SP is disposed between the lens subunit L3a and the lens subunit L3b. In Embodiment 3 of the present invention, the aperture stop SP is disposed between the lens subunit L2a and the lens subunit L2b.

Reference symbol G denotes an optical block which corresponds to an optical filter, a face plate, a crystal low pass filter, an infrared cut filter, or the like.

Reference symbol IP denotes an image plane. When the zoom lens according to each of the embodiments is used as a photographing optical system for a video camera or a digital still camera, the image plane IP corresponds to an image pickup surface of a solid state image pickup element (photo-electric conversion element) such as a CCD sensor or a CMOS sensor. When the zoom lens is used as a photographing optical system for a silver-halide film camera, the image plane IP corresponds to a photosensitive surface such as a film surface.

In FIGS. 1A, 1B, 1C, 5A, 5B, and 5C, arrows indicate movement loci of the respective lens units during zooming from the wide-angle end to the telephoto end. Movement loci of the respective lens units as shown in FIGS. 3A, 3B, and 3C are identical to those shown in FIGS. 1A, 1B, and 1C and thus omitted here.

In each of the following embodiments, the wide-angle end and the telephoto end are zoom positions in the case where a variable magnification lens unit (second lens unit L2 in each embodiment) is located at the respective ends of a range in which it is mechanically moveable on the optical axis.

In the aberration graphs, reference symbols d and g denote a d-line and a g-line, respectively. References $\Delta M$ and $\Delta S$ denote a meridional image plane and a sagittal image plane, respectively. Chromatic aberration of magnification is shown with respect to the g-line. Reference symbol Fno denotes an F number and $\omega$ denotes a half view angle.

Each of the zoom lenses described in the embodiments has optical performance corresponding to that of the solid state image pickup element whose cell pitch is, for example, about 2 micrometers to 3 micrometers, such as a CCD sensor or a CMOS sensor.

A plurality of lens units composing the zoom lens described in each of the embodiments are separated from one another based on intervals changed for zooming or focusing.

The zoom lens described in each of Embodiments 1 and 2 of the present invention includes four lens units L1 to L4. The zoom lens described in Embodiment 3 of the present invention includes three lens units L1 to L3.

One of the plurality of lens units composing the zoom lens is a correction (movable) lens unit for displacing an image formed by the zoom lens within a plane perpendicular to the optical axis to correct image blur (third lens unit L3 in each of Embodiments 1 and 2 and the second lens unit L2 in Embodiment 3).

The correction lens unit (movable lens unit) is disposed adjacent to the aperture stop SP and includes a first lens subunit located on the object side and a second lens subunit located on the image side. In each of Embodiments 1 and 2 of the present invention, the lens subunit L3a corresponds to the first lens subunit and the lens subunit L3b corresponds to the second lens subunit. In Embodiment 3 of the present invention, the lens subunit L2a corresponds to the first lens subunit and the lens subunit L2b corresponds to the second lens subunit. When the image formed by the zoom lens is to be displaced, the aperture stop SP is held and the first lens subunit and the second lens subunit are (integrally or separately) moved so as to have a component in a direction orthogonal to the optical axis (by different amounts).

Here, a maximum movement amount of the first lens subunit Sa and a maximum movement amount of the second lens subunit Sb in the direction orthogonal to the optical axis satisfy the following condition, $$0.7 < \left|\frac{Sa}{Sb}\right| < 1.4 \qquad (1)$$

where the signs of Sa and Sb are defined so that signs of Sa and Sb are the same if lens elements are moved in the same direction, and signs of Sa and Sb are different from each other if the lens elements are moved in reverse directions.

The conditional expression (1) relates to the movement amount of the first lens subunit and the movement amount of the second lens subunit in the case of blur correction. The first lens subunit and the second lens subunit compose a single lens unit in which an interval therebetween in the optical axis direction is not changed during zooming and focusing. Therefore, when the amount of deviation between the relative axes of both the lens subunits becomes larger, the amount of produced decentering increases. Even when |Sa/Sb| becomes smaller than a lower limit value of the conditional expression (1) or exceeds an upper limit value thereof, it is not preferable because the amount of deviation between the relative axes becomes larger and thus the amount of produced decentering aberration increases.

In order to prevent the amount of deviation between the relative axes at the time of blur correction from changing, Sa/Sb is more preferably set to 1.

In the zoom lens described in each of the embodiments, assume that a focal length of the entire system at the telephoto end is expressed by ft, a lateral magnification of the correction lens unit at the telephoto end is expressed by $\beta pt$, a lateral magnification of a lens part located closer to the image side than the second lens subunit at the telephoto end is expressed by $\beta qt$ (note that $\beta qt$ is set to 1 when the lens part is not located closer to the image side than the second lens subunit), and a light beam diameter of an F-number light beam passing through the aperture stop SP at the wide-angle end and that of an F-number light beam passing through the aperture stop SP at the telephoto end are expressed by $\phi W$ and $\phi T$, respectively. In such a case, the following condition is satisfied.

$$0.00035 < (\phi W - \phi T) \times |(1 - \beta pt) \times \beta qt|/\text{ft} \qquad (2)$$

In general, the amount of image blur caused at the telephoto end is larger than that caused at the wide-angle end. That is, the movement amount of the correction lens unit for image blur correction in the direction perpendicular to the optical axis becomes larger at the telephoto end. In the case where an effective diameter of a lens adjacent to the aperture stop SP is set to a size equal to a diameter of an axial F-number light beam (axial light beam for determining an F number), when the aperture stop SP is held and the correction lens unit is moved, the F-number light beam is significantly eclipsed at the telephoto end. In order to avoid this, the diameter of the F-number light beam at the telephoto end is set to a value smaller than that at the wide-angle end as in the case of $0 < (\phi W - \phi T)$.

When $|(1-\beta pt)\times\beta qt|/ft$ reduces, the movement amount of the correction lens unit which is required for image blur correction in the direction orthogonal to the optical axis becomes larger. Therefore, an increase in value of $((\phi W-\phi T)\times|(1-\beta pt)\times\beta qt|/ft)$ causes an increase in blur correction range in which the axial F-number light beam is not eclipsed at the telephoto end. When this value becomes smaller than a lower limit value of the conditional expression (2), it is more likely to eclipse the axial F-number light beam by the movement of the correction lens unit in the direction orthogonal to the optical axis, so that it is difficult to perform preferable image blur correction. Thus, the lower limit value of the conditional expression (2) may be set to 0.0035, more preferably 0.0071.

When the lens part is not located on the image side of the second lens subunit, the conditional expression (2) is expressed as follows.

$$0.00035<(\phi W-\phi T)\times|(1-\beta pt)|/ft$$

In the zoom lens described in each of the embodiments of the present invention, assume that a light beam diameter of the axial F-number light beam on an arbitrary lens surface of the correction lens unit at the telephoto end before the correction lens unit is moved so as to have a component in the direction orthogonal to the optical axis is expressed by A0$t$ and an effective diameter of the lens surface is expressed by EA. In such a case, the following condition is satisfied.

$$0.00035<(EA-A0t)\times|(1-\beta pt)\times\beta qt/ft \qquad (3)$$

In the conditional expression (3), if EA=A0$t$, when the correction lens unit is moved in the direction perpendicular to the optical axis, the axial F-number light beam is eclipsed. This means that the F-number changes when the image blur is corrected. Therefore, the adequate amount of light cannot be obtained.

To avoid this, 0<(EA−A0$t$) is set. In addition, when $|(1-\beta pt)\times\beta t|/ft$ reduces, the movement amount of the correction lens unit which is required for image blur correction in the direction orthogonal to the optical axis becomes larger. Therefore, an increase in value of $((EA-A0t)\times|(1-\beta pt)\times\beta qt|/ft)$ causes an increase in blur correction range in which the axial F-number light beam is not eclipsed. When this value becomes smaller than a lower limit value of the conditional expression (3), it is more likely to eclipse the axial F-number light beam by the movement of the correction lens unit in the direction orthogonal to the optical axis, so that it is difficult to perform the preferable image blur correction. Thus, the lower limit value of the conditional expression (3) may be set to 0.0035, more preferably 0.0071.

When the lens part is not located on the image side of the second lens subunit, the conditional expression (3) is expressed as follows.

$$0.00035<(EA-A0t)\times|(1-\beta pt)/ft$$

In the zoom lens described in each of Embodiments 1 and 2 of the present invention, a fourth lens unit L4 corresponds to the focal lens unit. In the zoom lens described in Embodiment 3 of the present invention, the third lens unit L3 corresponds to the focal lens unit.

In the zoom lens described in this embodiment, the following condition is satisfied, $$0.03<Dab/fp<0.77 \qquad (5)$$

where fp represents a focal length of the correction lens unit and Dab represents the interval between the first lens subunit and the second lens subunit.

The conditional expression (5) relates to a ratio between the interval Dab between the first lens subunit and the second lens subunit and the focal length fp of the correction lens unit. When Dab/fp exceeds an upper limit value of the conditional expression (5), the entire lens length of the correction lens unit becomes too large and thus a size of the entire lens system increases, so it is not preferable. The upper limit value may be set to 0.51, more preferably 0.34. When Dab/fp is smaller than a lower limit value of the conditional expression (5), the deterioration in performance due to the relative axis deviation between the first lens subunit and the second lens subunit becomes larger, so it is not preferable. The lower limit value may be set to 0.05, more preferably 0.09.

In the case where the lens part is located on the image side of the second lens subunit, it is preferable to satisfy the following condition, $$-0.31<\phi Rt/\phi P<3.1 \qquad (6),$$

where $\phi Rt$ represents a refractive power of the lens part at the telephoto end and $\phi P$ represents a refractive power of the correction lens unit.

The conditional expression (6) relates to a ratio between the refractive power of the correction lens unit $\phi P$ and the refractive power $\phi RT$ of the lens part which is located on the image side of the second lens subunit at the telephoto end. When $\phi Rt/\phi P$ is smaller than a lower limit value of the conditional expression (6), a refractive action made of the lens part located on the image side of the second lens subunit becomes weaker from a positive refractive power direction, so that a positive refractive power of the correction lens unit relatively becomes stronger.

As a result, the number of lenses composing the correction lens unit increases to reduce the controllability thereof using a correction lens unit driving actuator. The lower limit value of the conditional expression (6) may be set to −0.25, desirably, 0.05, more desirably 0.25.

When $\phi Rt/\phi P$ exceeds an upper limit value of the conditional expression (6), the positive refractive index of the correction lens unit becomes weaker to increase the movement amount of the correction lens unit for image blur correction. As a result, a size of structural members in a diameter direction increases, so it is not preferable. The upper limit value may be set to 2.1, more desirably 1.4.

Next, a feature of the structure described in each of the embodiments will be described.

In the lens sectional views with respect to Embodiments 1 and 2 of the present invention as shown in FIGS. 1A, 1B, 1C, 3A, 3B, and 3C, reference numeral L1 denotes a first lens unit having a positive refractive power (optical power=the reciprocal of a focal length), L2 denotes the second lens unit having a negative refractive power, L3 denotes the third lens unit having a positive refractive power, and L4 denotes the fourth lens unit having a positive refractive power.

The third lens unit L3 includes the lens subunit L3$a$ having a positive refractive power and the lens subunit L3$b$ having a positive refractive power.

The aperture stop SP is disposed between the lens subunit L3$a$ and the lens subunit L3$b$.

In each of Embodiments 1 and 2 of the present invention, during zooming from the wide-angle end to the telephoto end, as indicated by the arrows, the second lens unit L2 is moved toward the image side to change magnification and the fourth lens unit L4 is moved to make compensation for an image plane variation due to the change of magnification.

A rear focus system, in which the fourth lens unit L4 is moved on the optical axis to perform focusing, is employed.

A curve 4a indicates a movement locus for making compensation for an image plane variation caused by zooming from the wide-angle end to the telephoto end when focusing is performed on an infinite object. A curve 4b indicates a movement locus for making compensation for an image plane variation caused by zooming from the wide-angle end to the telephoto end when focusing is performed on a near object.

As described above, the movement locus of the fourth lens unit L4 is convex to the object side. Therefore, the effective use of a space between the third lens unit L3 and the fourth lens unit L4 is made to effectively achieve the shortening of the entire lens length.

Note that the first lens unit L1 and the third lens unit L3 are not moved in the optical axis direction during zooming and focusing.

In each of Embodiments 1 and 2 of the present invention, for example, when focusing from the infinite object to the near object is performed at the telephoto end, the fourth lens unit L4 is moved forward as indicated by an arrow 4C.

In each of Embodiments 1 and 2 of the present invention, the third lens unit L3 includes the lens subunit L3a serving as the first lens subunit which is located on the object side of the aperture stop SP and the lens subunit L3b serving as the second lens subunit which is located on the image side of the aperture stop SP. During zooming and focusing, the lens subunit L3a and the lens subunit L3b are held and thus the interval therebetween in the optical axis direction does not change.

In the case of blur correction, the aperture stop SP is not moved in the direction perpendicular to the optical axis and the lens subunit L3a and the lens subunit L3b are integrally moved to have a component in the direction perpendicular to the optical axis.

More specifically, in Embodiment 1 of the present invention, assume that a focal length f of the entire lens system is 46.53 mm (telephoto end). Here, when the blur correction is to be performed in the case where the entire lens system is tilted by 0.1°, the lens subunit L3a and the lens subunit L3b are integrally moved by about 0.088 mm so as to have a component in the direction perpendicular to the optical axis.

In Embodiment 2, assume that a focal length f of the entire lens system is 68.48 mm (telephoto end). Here, when the blur correction is to be performed in the case where the entire lens system is tilted by 0.3°, the lens subunit L3a and the lens subunit L3b are integrally moved by about 0.36 mm so as to have a component in the direction perpendicular to the optical axis.

As described above, in each of Embodiments 1 and 2 of the present invention, the correction lens unit L3 is composed of the lens subunit L3a and the lens subunit L3b which are disposed so as to sandwich the aperture stop SP, thereby reducing a size of the correction lens unit L3 for image blur correction. In addition, in the case of blur correction, the aperture stop SP is held and only the small-size lens subunits L3a and L3b for blur correction are moved so as to have a component in the direction orthogonal to the optical axis. According to such a structure, a load on the actuator can be reduced to perform preferable control.

The aperture stop SP is not located between the second lens unit L2 and the third lens unit L3, so a surface of the second lens unit L2 located on the most image side can be approached to a surface of the third lens unit L3 located on the most object side at the telephoto end. Therefore, the shortening of the entire lens length and an increase in zoom ratio are facilitated.

In Embodiment 1 of the present invention, a maximum aperture diameter of the aperture stop SP is maintained to $\phi$7.89 during zooming, so the axial F-number (Fno) light beam is limited in a lens part located on the object side of the third lens unit L3 at the telephoto end. As a result, a light beam width of the axial F-number light beam becomes smaller than the aperture diameter of the aperture stop at the telephoto end. Thus, even when the lens subunits L3a and L3b for blur correction are moved so as to have a component in the direction perpendicular to the optical axis, the F-number light beam is prevented from eclipsing.

In Embodiment 2 of the present invention, a stop diameter of the aperture stop SP is $\phi$8.57 at the wide-angle end, $\phi$5.35 at an intermediate zoom position in the case of the focal length f=50.23, and $\phi$5.41 at the telephoto end. In Embodiment 2, in the case of the intermediate zoom position, a light beam which is located outside the F-number light beam imaged on the axis and in which spherical aberration becomes excessive is cut to improve optical performance.

The stop diameter of the aperture stop SP at the telephoto end is set smaller than that at the wide-angle end to reduce the width of the axial F-number light beam at the telephoto end. Therefore, even when the lens elements for blur correction are moved so as to have a component in the direction perpendicular to the optical axis, the F-number light beam is prevented from eclipsing.

In each of Embodiments 1 and 2 of the present invention, the lens subunit L3a and the lens subunit L3b may be moved by different amounts in a range satisfying the conditional expression (1) to perform image stabilization.

In each of Embodiments 1 and 2 of the present invention, the lens subunit L3a is composed of a single lens G31 having a positive refractive power. In addition, the lens sub unit L3b is composed of two lenses, that is, a lens G32 having a negative refractive power and a lens G33 having a positive refractive power.

In order to sufficiently suppress a variation in chromatic aberration at the time of blur correction, it is preferable to reduce the amount of chromatic aberration produced by the lens subunit L3b.

In each of Embodiments 1 and 2 of the present invention, the lens sub unit L3b is composed of the two lenses and an adequate refractive power is set. Therefore, the variation in chromatic aberration at the time of image stabilization is suppressed to a problem-free level while sensitivity required for image stabilization is ensured.

In each of Embodiments 1 and 2 of the present invention, the second lens unit L2 includes at least three negative lenses and at least one positive lens. Therefore, a variation in aberration due to zooming is suppressed.

More specifically, the second lens unit L2 is composed of a lens G21 having a negative refractive power, a biconcave lens G22 having a negative refractive power, a biconvex lens G23 having a positive refractive power, and a lens G24 having a negative refractive power, which are arranged in order from the object side to the image side. The lens G21 has a meniscus shape which is convex on the object side.

In the lens sectional views with respect to Embodiment 3 of the present invention as shown in FIGS. 5A, 5B, and 5C, reference symbols L1 denotes the first lens unit having a negative refractive power, L2 denotes the second lens unit having a positive refractive power, and L3 denotes the third lens unit having a positive refractive power.

The second lens unit L2 includes the lens subunit L2a having a positive refractive power and the lens subunit L2b having a negative refractive power.

The aperture stop SP is disposed between the lens subunit L2a and the lens subunit L2b.

In the zoom lens described in Embodiment 3 of the present invention, during zooming from the wide-angle end to the telephoto end, the first lens unit L1 substantially reciprocates along a locus which is convex to the image side, the second lens unit L2 moves toward the object side, and the third lens unit L3 moves toward the image side. The aperture stop SP integrally moves with the second lens unit L2 during zooming.

In the zoom lens described in Embodiment 3 of the present invention, a change of magnification is mainly performed by moving the second lens unit L2. The compensation for an image plane shift due to the change of magnification is made by the reciprocating of the first lens unit L1 and the movement of the third lens unit L3 toward the image side.

Focusing is performed by the movement of the third lens unit L3.

Both the lens subunit L2a and the lens subunit L2b in the second lens unit L2 are moved by the same amount or different amounts so as to have at least a component in the direction perpendicular to the optical axis in the range satisfying the conditional expression (1), thereby performing image stabilization.

The interval between the lens subunit L2a and the lens subunit L2b in the optical axis direction is not changed during zooming and focusing.

In Embodiment 3 of the present invention, assume that a focal length f of the entire lens system is 15.86 mm. Here, when the blur correction is to be performed in the case where the entire lens system is tilted by 0.3°, the lens subunit L2a and the lens subunit L2b are integrally moved by about 0.04 mm so as to have a component in the direction perpendicular to the optical axis.

In Embodiment 3 of the present invention, in an order of from the object side to the image side, the lens subunit L2a is composed of a single or cemented lens including a lens G21 having a positive refractive power and a lens G22 having a negative refractive power. An object side surface of the lens G21 is convex. The lens G22 has a meniscus shape which is concave to the image side.

The lens subunit L2b is composed of a lens G23 having a negative refractive power and a biconvex lens G24. The G23 has a meniscus shape which is concave to the image side.

Next, Numerical Embodiments 1 to 3 corresponding to Embodiments 1 to 3 will be described. In the numerical embodiments, "i" denotes "a surface order which is counted from the object side, ri denotes a curvature radius of an i-th surface, and di denotes an interval between the i-th surface and an (i+1)-th surface. Further, ni denotes a refractive index based on a d-line and υi denotes an Abbe number based on the d-line.

Two surfaces closest to the image side are surfaces of the optical block G. When a displacement amount from a surface vertex in the optical axis direction at a position of a height H from the optical axis is expressed by X, an aspherical shape is expressed by the following expression, $$X = \frac{(1/R)h^2}{1+\sqrt{\{1-(1+k)(h/R)^2\}}} + Bh^4 + Ch^6 + Dh^8 + Eh^{10} + Fh^{12}$$

where R denotes a paraxial curvature radius, k denotes a conic constant, and B, C, D, E, and F denotes aspherical coefficients.

Note that [e-X] indicates [×10$^{-X}$]. In addition, f denotes the focal length, Fno denotes the F number, and ω denotes a half field angle. Table 1 shows relationships between the respective conditional expressions and various numerical values in the numeral embodiments.

Reference symbol EAi denotes an effective light beam diameter of an i-th surface which is a part of the correction lens unit.

Numerical Embodiment 1
f = 4.84-46.53 Fno = 1: 1.85-2.40 2ω = 57.4°-6.5°

| | | | |
|---|---|---|---|
| r1 = 44.210 | d1 = 1.10 | n1 = 1.84666 | ν1 = 23.9 |
| r2 = 21.670 | d2 = 4.36 | n2 = 1.60311 | ν2 = 60.6 |
| r3 = −206.338 | d3 = 0.17 | | |
| r4 = 18.632 | d4 = 2.64 | n3 = 1.77250 | ν3 = 49.6 |
| r5 = 51.168 | d5 = variable | | |
| r6 = 36.639 | d6 = 0.60 | n4 = 1.84666 | ν4 = 23.9 |
| r7 = 6.127 | d7 = 2.03 | | |
| r8 = −15.346 | d8 = 0.60 | n5 = 1.77250 | ν5 = 49.6 |
| r9 = 15.346 | d9 = 1.70 | | |
| r10 = 14.363 | d10 = 2.20 | n6 = 1.84666 | ν6 = 23.9 |
| r11 = −11.482 | d11 = 0.08 | | |
| r12 = −10.208 | d12 = 0.60 | n7 = 1.77250 | ν7 = 49.6 |
| r13 = 46.394 | d13 = variable | | |
| r14 = 8.901 (Aspherical surface) | d14 = 2.19 | n8 = 1.69350 | ν8 = 53.2 |
| r15 = 164.324 | d15 = 1.26 | | |
| r16 = ∞(diaphragm) | d16 = 2.15 | | |
| r17 = 17.939 | d17 = 0.60 | n9 = 1.84666 | ν9 = 23.9 |
| r18 = 7.672 | d18 = 0.48 | | |
| r19 = 15.794 | d19 = 1.35 | n10 = 1.60311 | ν10 = 60.6 |
| r20 = −127.786 | d20 = variable | | |
| r21 = 12.124 | d21 = 2.75 | n11 = 1.71300 | ν11 = 53.9 |
| r22 = −8.931 | d22 = 0.60 | n12 = 1.84666 | ν12 = 23.9 |
| r23 = −42.572 | d23 = variable | | |
| r24 = ∞ | d24 = 2.40 | n13 = 1.51633 | ν13 = 64.1 |
| r25 = ∞ | | | |

| | Focal Length | | |
|---|---|---|---|
| Variable interval | 4.84 | 27.60 | 46.53 |
| d5 | 0.60 | 13.46 | 15.73 |
| d13 | 15.91 | 3.05 | 0.78 |
| d20 | 4.66 | 2.12 | 5.81 |
| d23 | 5.60 | 8.14 | 4.45 |

Aspherical coefficient
14th surface

| K | B | C | D | E |
|---|---|---|---|---|
| −1.9147e−01 | −1.2085e−04 | −8.6863e−07 | 1.3601e−08 | −2.8890e−10 |

Effective light beam diameter EAi of correction lens
unit and axial F-number light beam diameter A0ti

| | |
|---|---|
| EA14 = 8.8 | A0t14 = 6.54 |
| EA15 = 8.8 | A0t15 = 6.24 |
| EA17 = 7.1 | A0t17 = 5.19 |
| EA18 = 6.8 | A0t18 = 4.95 |
| EA19 = 6.8 | A0t19 = 4.96 |
| EA20 = 6.8 | A0t14 = 4.84 |
| φW = 7.89 | φT = 5.88 |

Numerical Embodiment 2
f = 4.97-68.48 Fno = 1: 1.85-3.00 2ω = 56.1°-4.4°

| | | | |
|---|---|---|---|
| r1 = 43.681 | d1 = 1.20 | n1 = 1.84666 | ν1 = 23.9 |
| r2 = 23.079 | d2 = 4.21 | n2 = 1.69680 | ν2 = 55.5 |
| r3 = 3595.560 | d3 = 0.17 | | |
| r4 = 20.843 | d4 = 2.68 | n3 = 1.69680 | ν3 = 55.5 |
| r5 = 47.982 | d5 = Variable | | |
| r6 = 26.306 | d6 = 0.60 | n4 = 1.84666 | ν4 = 23.9 |
| r7 = 5.713 | d7 = 2.62 | | |
| r8 = −14.648 | d8 = 0.60 | n5 = 1.83400 | ν5 = 37.2 |
| r9 = 22.013 | d9 = 0.54 | | |
| r10 = 13.116 | d10 = 2.50 | n6 = 1.92286 | ν6 = 18.9 |
| r11 = −13.116 | d11 = 0.20 | | |
| r12 = −10.220 | d12 = 0.60 | n7 = 1.74950 | ν7 = 35.3 |
| r13 = 56.363 | d13 = variable | | |
| r14 = 12.194 (Aspherical surface) | d14 = 2.20 | n8 = 1.69350 | ν8 = 53.2 |
| r15 = −78.656 | d15 = 1.36 | | |
| r16 = ∞(diaphragm) | d16 = 3.41 | | |
| r17 = 22.092 | d17 = 0.65 | n9 = 1.92286 | ν9 = 18.9 |
| r18 = 9.687 | d18 = 0.33 | | |
| r19 = 16.300 | d19 = 1.50 | n10 = 1.48749 | ν10 = 70.2 |
| r20 = −55.160 | d20 = variable | | |
| r21 = 14.157 | d21 = 2.30 | n11 = 1.74400 | ν11 = 44.8 |
| r22 = −14.157 | d22 = 0.60 | n12 = 1.84666 | ν12 = 23.9 |
| r23 = −55.529 | d23 = variable | | |
| r24 = ∞ | d24 = 2.40 | n13 = 1.51633 | ν13 = 64.1 |
| r25 = ∞ | | | |

| | Focal Length | | |
|---|---|---|---|
| Variable interval | 4.97 | 50.24 | 68.48 |
| d5 | 0.55 | 18.49 | 19.43 |
| d13 | 19.59 | 1.65 | 0.71 |
| d20 | 5.87 | 5.33 | 9.23 |
| d23 | 6.21 | 6.75 | 2.86 |

Aspherical coefficients
14th surface

| K | B | C | D | E | F |
|---|---|---|---|---|---|
| −1.3677e+00 | −3.5421e−07 | −2.6458e−07 | 1.2147e−08 | −1.1268e−10 | −1.33342e−12 |

Effective light beam diameter EAi of correction lens
unit and axial F-number light beam diameter A0ti

| | |
|---|---|
| EA14 = 9.4 | A0t14 = 5.99 |
| EA15 = 9.4 | A0t15 = 5.78 |
| EA17 = 7.5 | A0t17 = 4.50 |
| EA18 = 7.2 | A0t18 = 4.32 |
| EA19 = 7.2 | A0t19 = 4.32 |
| EA20 = 7.2 | A0t20 = 4.18 |
| φW = 8.57 | φT = 5.41 |

Numerical Embodiment 3
f = 5.51-15.86 Fno = 1: 2.60-4.84 2ω = 62.2°-23.6°

| | | | |
|---|---|---|---|
| r1 = 61.211 | d1 = 1.60 | n1 = 1.80238 | ν1 = 40.7 |
| r2 = 4.687 (Aspherical surface) | d2 = 1.76 | | |
| r3 = 9.061 | d3 = 2.22 | n2 = 1.84666 | ν2 = 23.9 |
| r4 = 33.467 | d4 = variable | | |
| r5 = 4.807 (Aspherical surface) | d5 = 1.94 | n3 = 1.80238 | ν3 = 40.7 |
| r6 = 621.641 | d6 = 0.52 | n4 = 1.68893 | ν4 = 31.1 |
| r7 = 4.092 | d7 = 1.80 | | |
| r8 = ∞(diaphragm) | d8 = 0.70 | | |
| r9 = 15.903 | d9 = 0.45 | n5 = 1.80518 | ν5 = 25.4 |
| r10 = 6.101 | d10 = 1.60 | n6 = 1.66910 | ν6 = 55.4 |
| r11 = −16.805 | d11 = variable | | |
| r12 = 10.370 | d12 = 1.33 | n7 = 1.58313 | ν7 = 59.4 |
| r13 = 54.046 | d13 = variable | | |
| r14 = ∞ | d14 = 2.61 | n8 = 1.51633 | ν8 = 64.1 |
| r15 = ∞ | | | |

-continued

Numerical Embodiment 3
f = 5.51-15.86 Fno = 1: 2.60-4.84 2ω = 62.2°-23.6°

| | Focal Length | | |
|---|---|---|---|
| Variable interval | 5.51 | 9.40 | 15.86 |
| d4 | 13.38 | 5.17 | 0.50 |
| d11 | 3.84 | 9.70 | 18.71 |
| d13 | 2.97 | 2.47 | 1.53 |

Aspherical coefficients

| K | B | C | D | E |
|---|---|---|---|---|
| | | 2nd surface | | |
| −1.0131e+00 | 2.9121e−04 | 3.8572e−08 | 1.0418e−07 | −3.4665e−09 |
| | | 5th surface | | |
| −3.5341e−01 | −3.5794e−05 | −5.9201e−06 | 6.2449e−07 | −9.4779e−09 |

Effective light beam diameter EAi of correction lens unit and axial F-number light beam diameter A0ti

| EA5 = 5.1 | A0t5 = 4.58 |
|---|---|
| EA6 = 5.1 | A0t6 = 4.13 |
| EA7 = 4.3 | A0t7 = 3.79 |
| EA9 = 4.6 | A0t9 = 4.07 |
| EA10 = 5.0 | A0t10 = 4.04 |
| EA11 = 5.0 | A0t11 = 4.04 |
| φW = 3.96 | φT = 3.96 |

TABLE 1

| Conditional expression | Numerical example | | |
|---|---|---|---|
| | 1 | 2 | 3 |
| (1) | 1.0 | 1.0 | 1.0 |
| (2) | 0.0398 | 0.0456 | 0.0000 |
| (3) | 0.0364-0.0507 | 0.0416-0.0523 | 0.0593-0.1134 |
| (5) | 0.21 | 0.27 | 0.20 |
| (6) | 1.01 | 1.05 | 0.57 |

Next, an example of a video camera (image pickup apparatus) using the zoom lens system according to any of the embodiments of the present invention as a photographing optical system will be described with reference to FIG. 7.

In FIG. 7, the video camera includes a video camera main body 10, a photographing optical system 11, a solid state image pickup element 12 such as a CCD sensor, a memory 13, and a finder 14. The photographing optical system 11 is composed of the zoom lens system according to any of the embodiments of the present invention. The solid image pickup element 12 receives a subject image formed by the photographing optical system 11. The memory 13 stores the subject image received by the solid image pickup element 12. The finder 14 is used for observing the subject image displayed on a display element which is not shown. The display element is composed of a liquid crystal panel and the like and the subject image formed on the solid state image pickup element 12 is displayed thereon.

As described above, the zoom lens system according to the present invention is applied to an image pickup apparatus such as a video camera. Therefore, an image pickup apparatus which is a small size and has high optical performance is realized.

The zoom lens system according to the present invention can be applied to a digital still camera in the same manner.

This application claims priority from Japanese Patent Application No. 2005-001491 filed on Jan. 6, 2005, which is hereby incorporated by reference herein.

What is claimed is:

1. A zoom lens system, comprising in order from object side to image side:

a first lens unit having a negative refractive power;

a second lens unit having a positive refractive power, the second lens unit including an aperture stop, a first lens subunit located on an object side of the aperture stop and a second lens subunit located on an image side of the aperture stop;

a third lens unit having a positive refractive power, wherein an interval between respective adjacent lens units varies during zooming, wherein the second lens unit is movable to displace an image formed by the zoom lens system within a plane perpendicular to an optical axis, wherein when the image formed by the zoom lens system is displaced within the plane perpendicular to the optical axis, the aperture stop is held, the first lens subunit and the second lens subunit are separately moved in a direction which has a component orthogonal to the optical axis, wherein the following conditional expression is satisfied, $$0.03 < Dab/fp \leq 0.21$$

$$-0.31 \leq \phi Rt/\phi P < 3.1$$

where fp represents a focal length of the second lens unit, Dab represents an interval between the first lens subunit and the second lens subunit, φRt represents a refractive power of the third lens unit at a telephoto end and φP represents a refractive power of the second lens unit, and wherein the first lens unit is the most object side lens unit in the lens system.

2. A zoom lens system according to claim 1, wherein the following conditional expression is satisfied, $$0.00035 < (\phi W - \phi T) \times |(1 - \beta pt) \times \beta qt|/ft,$$

where ft represents a focal length of an entire system at a telephoto end, βpt represents a lateral magnification of the second lens unit at the telephoto end, βqt represents a lateral magnification of third lens unit at the telephoto end, and φW and φT represent a light beam diameter of an F-number light beam passing through the aperture stop at a wide-angle end and a light beam diameter of an F-number light beam passing through the aperture stop at the telephoto end, respectively.

3. A zoom lens system according to claim 1, wherein the following conditional expression is satisfied, $$0.00035 < (EA - A0t) \times |(1 - \beta pt) \times \beta qt|/ft,$$

where ft represents a focal length of an entire system at a telephoto end, βpt represents a lateral magnification of the second lens unit at the telephoto end, βqt represents a lateral magnification of the third lens unit at the telephoto end, A0t represents a light beam diameter of an axial F-number light beam on an arbitrary lens surface of the second lens unit at the telephoto end before the second lens unit is moved to have the component in the direction orthogonal to the optical axis, and EA represents an effective diameter of the lens surface.

4. An image pickup apparatus, comprising:
a zoom lens system including, in order from object side to image side:
- a first lens unit having a negative refractive power;
- a second lens unit having a positive refractive power, the second lens unit including an aperture stop, a first lens subunit located on an object side of the aperture stop and a second lens subunit located on an image side of the aperture stop;
- a third lens unit having a positive refractive power,
wherein an interval between respective adjacent lens units varies during zooming;
wherein the second lens unit is movable to displace an image formed by the zoom lens system within a plane perpendicular to an optical axis,
wherein when the image formed by the zoom lens system is displaced within the plane perpendicular to the optical axis, the aperture stop is held, the first lens subunit and the second lens subunit are separately moved in a direction which has a component orthogonal to the optical axis,
wherein the following conditional expression is satisfied, $$0.03 < Dab/fp \leq 0.21$$

$$-0.31 \leq \phi Rt/\phi P < 3.1$$

where fp represents a focal length of the second lens unit, Dab represents an interval between the first lens subunit and the second lens subunit, $\phi Rt$ represents a refractive power of the third lens unit at a telephoto end and $\phi P$ represents a refractive power of the second lens unit, and wherein the first lens unit is the most object side lens unit in the lens system; and a solid state image pickup element for receiving the image formed by the zoom lens system.

* * * * *